United States Patent
Kim et al.

(10) Patent No.: US 12,501,523 B2
(45) Date of Patent: Dec. 16, 2025

(54) INDUCTION HEATING APPARATUS AND METHOD FOR CONTROLLING INDUCTION HEATING APPARATUS

(71) Applicant: LG ELECTRONICS INC., Seoul (KR)

(72) Inventors: Gwangrok Kim, Seoul (KR); Jung Youn Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 951 days.

(21) Appl. No.: 17/586,075

(22) Filed: Jan. 27, 2022

(65) Prior Publication Data
US 2022/0240354 A1    Jul. 28, 2022

(30) Foreign Application Priority Data

Jan. 27, 2021    (KR) .......................... 10-2021-0011744

(51) Int. Cl.
*H05B 6/06* (2006.01)
*H05B 6/12* (2006.01)

(52) U.S. Cl.
CPC ........... *H05B 6/062* (2013.01); *H05B 6/1209* (2013.01); *H05B 2206/02* (2013.01)

(58) Field of Classification Search
CPC .. H05B 2206/02; H05B 6/062; H05B 6/1209; H05B 6/08; H05B 2213/05; H05B 2213/07; H05B 6/06; H05B 6/12; H05B 6/065; H05B 6/1236
USPC ........... 99/358, DIG. 14, 451; 219/620, 660, 219/661, 663, 626, 665, 664; 363/95, 37
See application file for complete search history.

(56) References Cited

U.S. PATENT DOCUMENTS

| 5,111,014 A | 5/1992 | Tanaka et al. |
| 11,877,373 B2 * | 1/2024 | Choi .................... H05B 6/1209 |
| 2005/0247703 A1 | 11/2005 | Ryu |

(Continued)

FOREIGN PATENT DOCUMENTS

| JP | H07-020374 | 3/1995 |
| KR | 10-2008-0057399 | 6/2008 |

(Continued)

OTHER PUBLICATIONS

European Search Report dated May 30, 2022 issued in EP Application No. 22153584.2.

(Continued)

*Primary Examiner* — Vy T Nguyen
*Assistant Examiner* — Abigail H Rhue
(74) *Attorney, Agent, or Firm* — KED & ASSOCIATES, LLP

(57) ABSTRACT

A method for controlling an induction heating apparatus comprises receiving a power level for a heating region, supplying a switching signal to an inverter circuit based on a predetermined reference frequency, measuring an output current value of the inverter circuit, measuring a DC link voltage value, calculating an output power value of the working coil based on the output current value of the inverter circuit and the DC link voltage value, determining a heating frequency of the inverter circuit based the result of comparison by comparing the output power value of the working coil with a required power value, and supplying a switching signal to the inverter circuit based on the heating frequency.

17 Claims, 8 Drawing Sheets

(56) References Cited

U.S. PATENT DOCUMENTS

2018/0177000 A1    6/2018  Son et al.
2021/0127463 A1    4/2021  Son et al.
2021/0267024 A1    8/2021  Choi et al.

FOREIGN PATENT DOCUMENTS

| KR | 10-2009-0061863 | 6/2009 |
| KR | 10-1832211 | 2/2018 |
| KR | 10-2020-0043624 | 4/2020 |
| KR | 10-2201189 | 1/2021 |
| WO | WO 2019/226019 | 11/2019 |

OTHER PUBLICATIONS

Korean Office Action dated Apr. 28, 2025, issued in Application No. 10-2021-0011744.

\* cited by examiner

INDUCTION HEATING APPARATUS AND METHOD FOR CONTROLLING INDUCTION HEATING APPARATUS

CROSS-REFERENCE TO RELATED APPLICATION

This application claims priority to and the benefit of Korean Patent Application No. 10-2021-0011744, filed in Korea on Jan. 27, 2021, the disclosure of which is incorporated herein by reference in its entirety.

BACKGROUND

1. Field

The present disclosure relates to an induction heating apparatus and a method for controlling the induction heating apparatus.

2. Background

An induction heating apparatus is a mechanism that heats a container by generating an eddy current in a metal container, using a magnetic field generated around a working coil. When the induction heating apparatus is driven, an alternating current may be applied to the working coil. Accordingly, an induction magnetic field may be generated around the working coil disposed in the induction heating apparatus. When a magnetic force line of the induced magnetic field generated in this way passes through the bottom of the container having a metal component placed on the working coil, an eddy current may be generated inside the bottom of the container. When the eddy current generated in this way flows through the container, the container itself may be heated.

In general, AC current for driving a working coil is supplied by an inverter circuit including a plurality of switching elements. The magnitude of the AC current supplied to the working coil varies based on the driving frequency of the inverter circuit. The driving frequency of the inverter circuit is determined based on the required power value of the working coil, and the required power value of the working coil is a value determined based on a power level set for a heating region (or heating area) corresponding to the working coil.

That is, when a user sets the power level for the heating region, the required power value of the working coil corresponding to the set power value is determined. To heat a container according to the power level set by the user, the actual output power value of the working coil has to match the required power value. Therefore, in the process of controlling the induction heating apparatus, it is necessary to measure the output power value of the working coil and adjust the driving frequency of the inverter circuit based on the output power value.

Cited document 1 (Korean Patent Publication No. 10-2008-0057399), the subject matter of which is incorporated herein by reference, discloses a method and apparatus for controlling an inverter. FIG. 1 is a block diagram illustrating the configuration of the apparatus for controlling the inverter disclosed in Cited document 1. The apparatus for controlling the inverter disclosed in Cited document 1 (hereinafter, the inverter controlling apparatus) includes a DC converter 71 supplied DC power, a power circuit 72, a power voltage sensing circuit 73 configured to sense the power voltage supplied through the DC converter 71, a motor 74, an inverter IC (IPM) 75 configured to supply power to power to the motor 74, a shunt resistor 76 configured to detect the current flowing through the inverter IC (IMP) 75 to prevent overcurrent, a comparator 77 configured to compare the voltage Va applied to the shunt resistor 76 with a preset reference voltage Vb, thereby transmitting the result of comparison, a microcomputer 78 configured to output a three-phase power control signal to the inverter IC (IPM) 75 to control the driving of the motor 74 and the driving of other loads based on the comparison result of the comparator 77, and a load drive part 79 configured to drive a load such as a heater 80 based on a control signal of the microcomputer 78.

In Cited document 1 as shown in FIG. 1, a control signal is supplied to IC (IPM) 75 to control the driving of the motor and other loads. The control signal is generated based on the result of the comparison between the voltage Va applied to the shunt resistor 76 and the reference voltage Vb.

The inverter controlling apparatus according to Cited document 1 has to include not only the shunt resistor 76 for controlling the inverter IC (IPM) and the driving of the load but also the voltage measuring circuit and the current measuring circuit for measuring the voltage and the current applied to the shunt resistor 76.

Cited document 2 (Korean Patent Publication No. 10-2009-0061863), the subject matter of which is incorporated herein by reference, discloses an inverter heating cooker and a method for controlling the same. FIG. 2 is a block diagram illustrating the configuration of the inverter heating cooker (or the induction heating cooker) disclosed in Cited document 2.

Referring to FIG. 2, the inverter heating cooker includes a power source part 81 receiving and supplying commercial power for home use, an IGBT drive part 85, a power element 86, a heating coil 87, an inverter circuit including a resonance capacitor and generating and outputting a resonance voltage for heating food contained in a container or vessel, an input voltage sensor 82, an input current sensor 83, a microcomputer 84 controlling the operation of the induction heating cooker, and a trigger part 88 outputting a trigger signal when the resonance voltage generated in the inverter circuit reaches a preset voltage level.

In Cited document 2, power consumption may be calculated based on the input voltage value detected by the input voltage sensor 82 and the input current detected by the input current sensor 83, and the inverter circuit may be controlled based on the calculated power consumption.

Ultimately, according to the prior art, an element or circuit (e.g., the shunt resistor, the input voltage sensing circuit and the input current sensing circuit) is additionally required in order to control the inverter circuit and control the output of the load. Accordingly, the prior art has a disadvantage in that the device configuration is complicated and the manufacturing cost is increased.

According to the prior art, the output power value of the load or heating coil is not calculated based on the actual voltage value and the actual current input to the load or the heating coil, but the output power value is calculated based on the magnitude of the voltage and current input from the outside. Therefore, it is difficult to calculate an accurate output power value, and accordingly, it is difficult to accurately control the driving of the load or heating coil.

In addition, according to the prior art, the calculation of the output power value and the control of the load or heating coil may be performed based on the detected value using a hardware detection circuit such as the input voltage detection circuit or the input current detection circuit, so that it can be difficult to quickly control the load or heating coil in response to change in the output power value.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
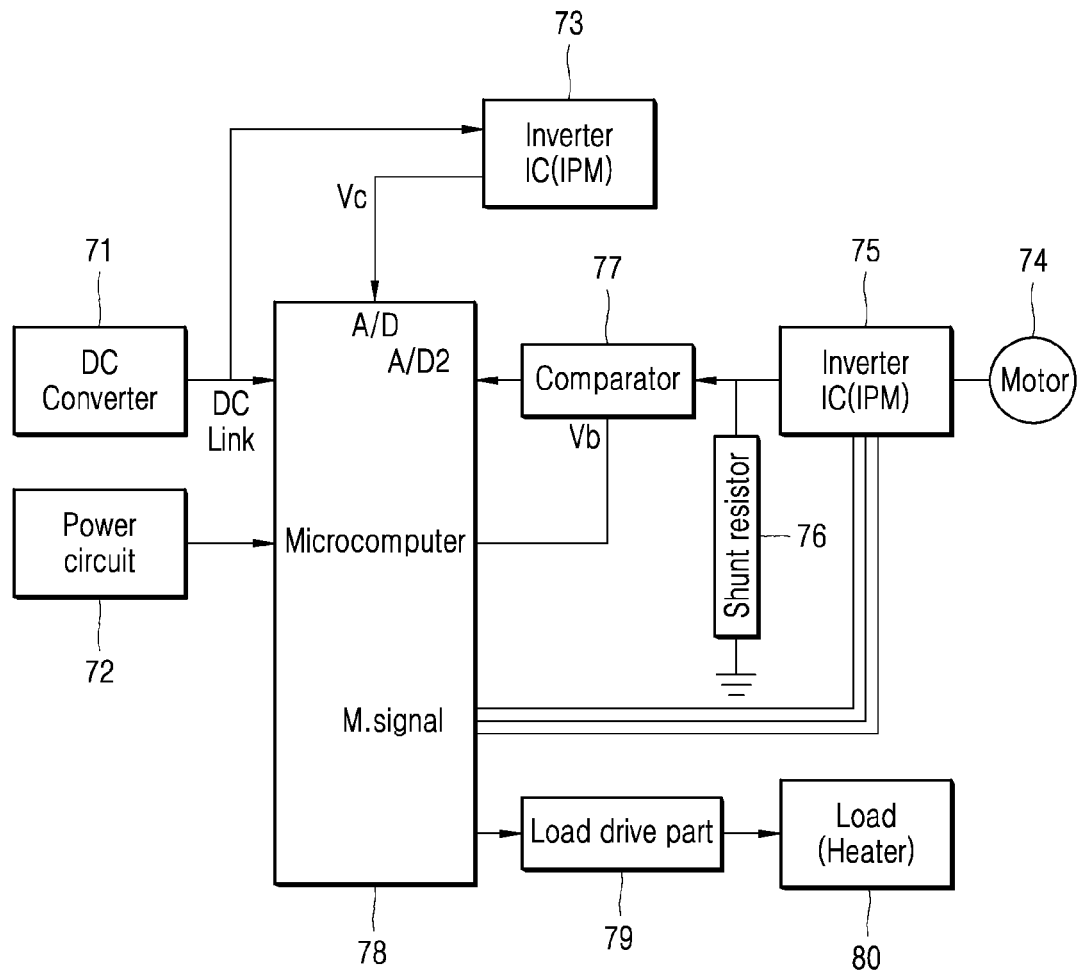
FIG. 1 is a block diagram illustrating the configuration of the apparatus for controlling the inverter disclosed in Cited document 1.
Figure 2:
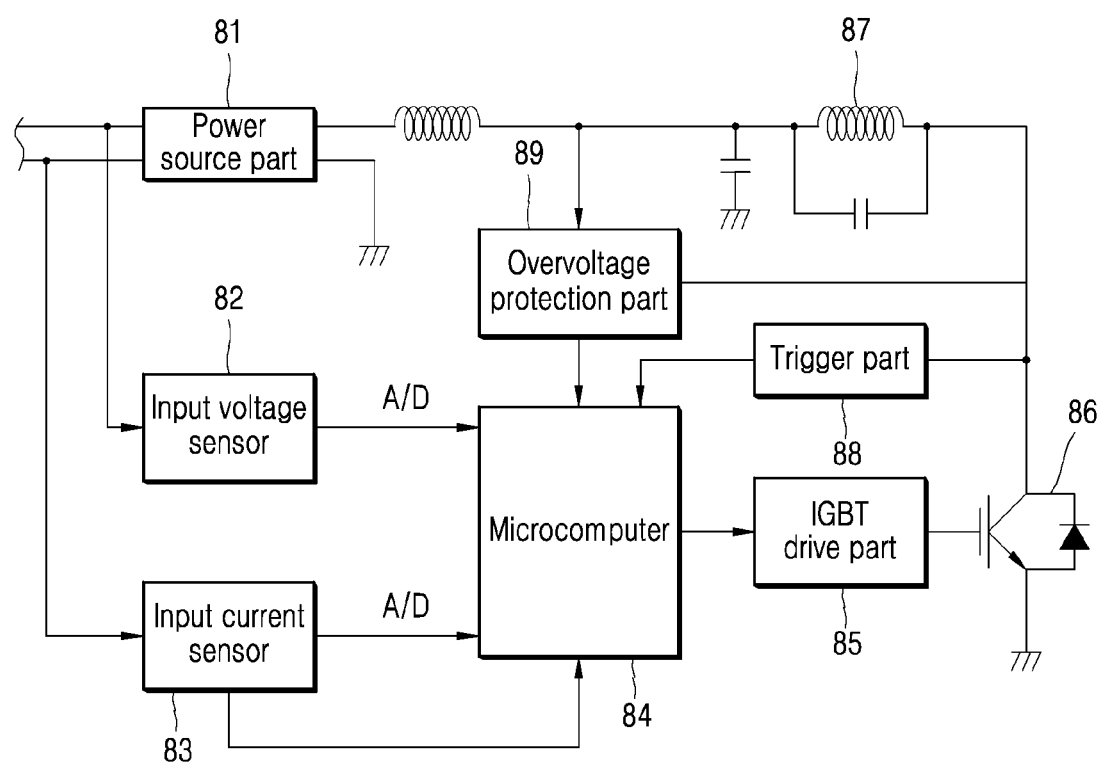
FIG. 2 is a block diagram illustrating the configuration of the inverter heating cooker (or the induction heating cooker) disclosed in Cited document 2.

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

Figure 3:
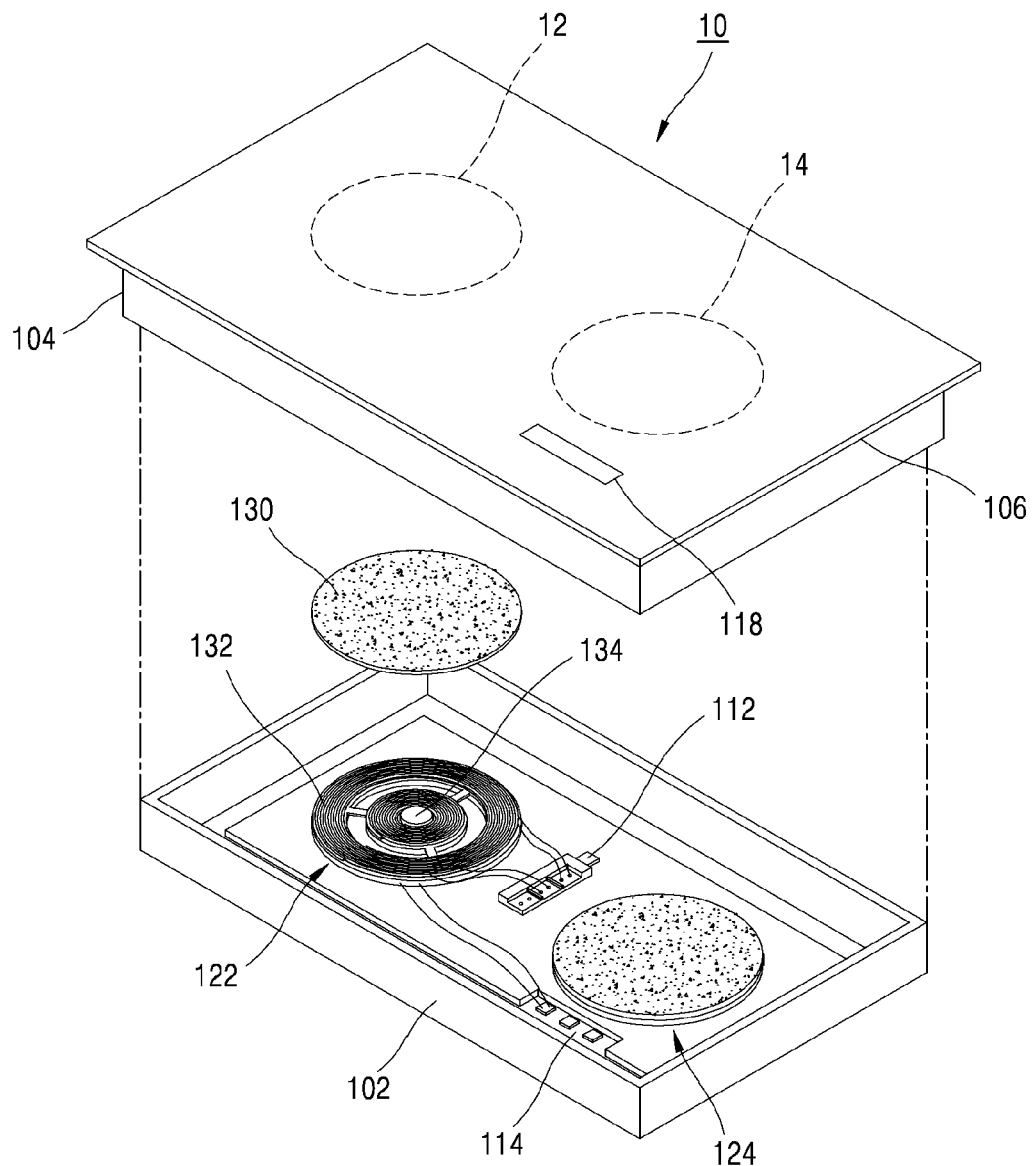
FIG. 3 is an exploded perspective diagram illustrating an induction heating apparatus according to one embodiment of the present disclosure.

FIG. 3 is an exploded perspective diagram illustrating an induction heating apparatus according to one embodiment of the present disclosure. Referring to FIG. 3, an induction heating apparatus according to one embodiment of the present disclosure may include a case 102 defining a body thereof and a cover plate 104 coupled to the case 102 and sealing the case 102.

The cover plate 104 may be coupled to an upper surface of the case to close the space formed in the case 102 from the outside. The cover plate 104 may include a top plate 106 on which an object to be heated (i.e., a container for cooking food) is placed. The top plate 106 may be made of a tempered glass material such as ceramic glass, but is not limited thereto. The material of the top plate 106 may vary according to embodiments.

Heating regions 12 and 14 (or heating areas) corresponding to working coil assemblies 122 and 124, respectively, may be formed in the top plate 106. Lines or figures corresponding to the heating regions 12 and 14 may be printed or displayed on the top plate 106 in order for a user to clearly recognize the positions of the heating regions 12 and 14.

The case 102 may have a hexahedral shape with an open top. The working coil assembly 122 and 124 for heating a container or vessel may be disposed in the space formed inside the case 102. In addition, an interface unit 114 (or interface) may be provided inside the case 102 and have functions to adjust a power level of each heating region 12 and 14 and display related information to the induction heating apparatus 10. The interface unit 114 may be a touch panel that is capable of both inputting information and displaying information by touch, but the interface unit 114 having a different structure may be provided according to embodiments.

A manipulation region 118 may be formed in a position corresponding to the interface unit 108 in the top plate 106. For user manipulation, characters or images may be printed on the manipulation region 118. The user may perform a desired operation by touching a specific point of the manipulation region 118 with reference to the characters or images pre-printed on the manipulation region 118.

The user may set the power level of each heating region 12 and 14 through the interface unit 114. The power level may be indicated by a number (e.g., 1, 2, 3, . . . , 9) on the manipulation region 118. When the power level for each heating region 12 and 14 is set, the required power value and the heating frequency of the working coil assemblies responding to the respective heating regions 12 and 14 may be determined. A controller may drive each working coil so that the actual output power value can match the required power value set by the user based on the determined heating frequency. In the space formed inside the case 102 may be further provided a power source part 112 (or power source) for supplying power to the working coil assemblies 122 and 124 or the interface unit 114.

In the embodiment of FIG. 3, two working coil assemblies (i.e., a first working coil assembly 122 and a second working coil assembly 124) are disposed inside the case 102. However, three or more working coil assemblies may be provided in the case 102 according to embodiments.

Each working coil assembly 122 and 124 may include a working coil configured to an induced magnetic field using a high frequency alternating current supplied by the power source part 112, and an insulating sheet configured to protect the coil from heat generated by the container. For example, the first working coil 122 shown in FIG. 3 may include a first working coil 132 for heating the container put in the first heating region 12 and a first insulating sheet 130. Although not shown in the drawings, the second working coil 124 may include a second working coil and a second insulating sheet. The insulating sheet may not be provided according to embodiments.

A temperature sensor 134 may be provided at the center of each working coil. For example, the temperature sensor 134 may be provided in the center of the first working coil 132 as shown in FIG. 3. The temperature sensor may measure the temperature of the container put in each heating region. In one embodiment of the present disclosure, the temperature sensor may be a thermistor temperature sensor having a variable resistance of which a resistance value changes according to the temperature of the container, but is not limited thereto.

In the embodiment, the temperature sensor may output a sensing voltage corresponding to the temperature of the container, and the sensing voltage output from the temperature sensor may be transmitted to the controller. The controller may check the temperature of the container based on the magnitude of the sensing voltage output from the temperature sensor. When the temperature of the container is a preset reference value or more, the controller may perform an overheat protection operation of lowering the actual power value of the working coil or stopping the driving of the working coil.

Although not shown in FIG. 3, a circuit board on which a plurality of circuits or elements including the controller may be disposed in the space formed inside the case 102. The controller may perform a heating operation by driving each working coil based on the user's heating start command input through the interface unit 114. When the user inputs a heating terminating command through the interface unit 114, the controller may stop the driving of the working coil to terminate the heating operation.

Figure 4:
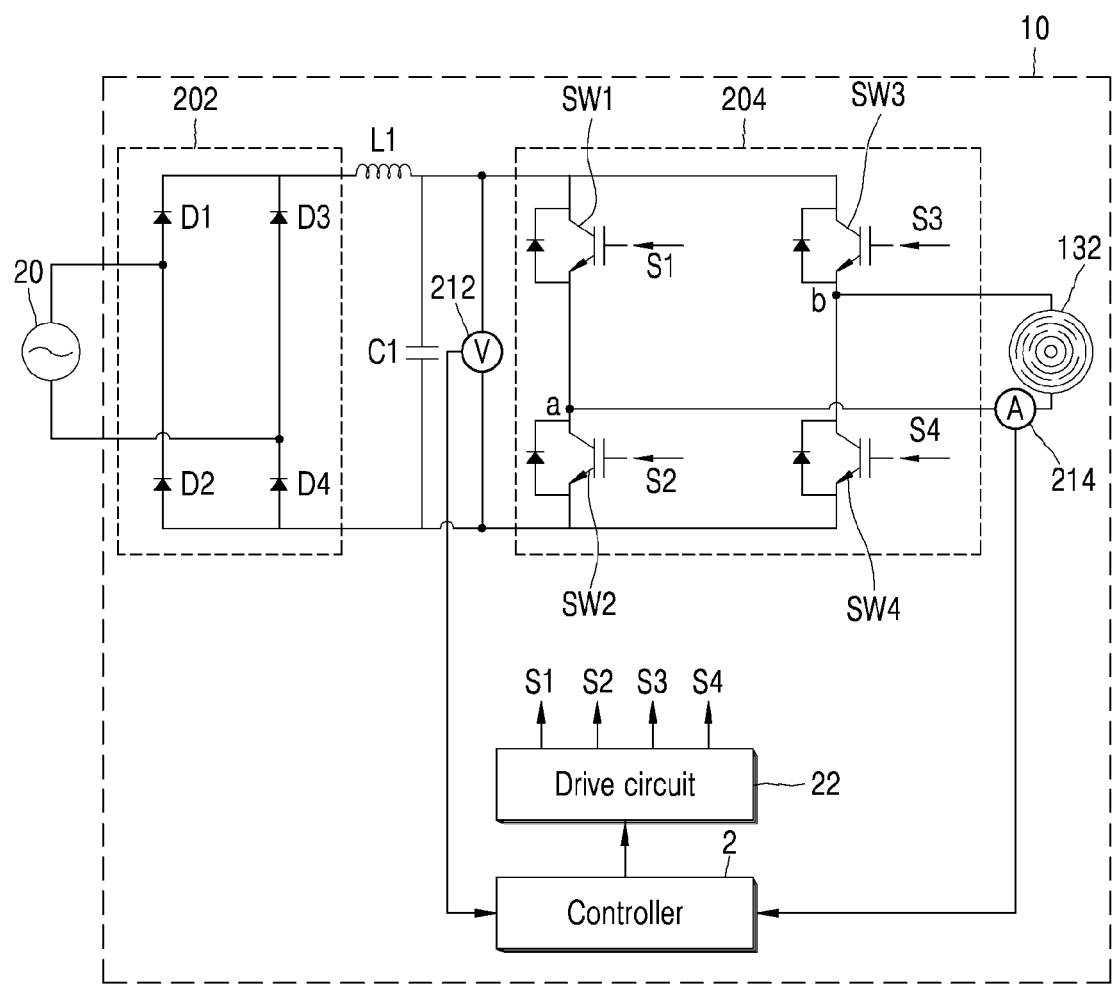
FIG. 4 is a circuit diagram of the induction heating apparatus according to one embodiment.

FIG. 4 is a circuit diagram of an induction heating apparatus according to one embodiment. Referring to FIG. 4, the induction heating apparatus 10 according to one embodiment may include a rectifier circuit 202, a smoothing circuit L1 and C1, an inverter circuit 204, a working coil 132, a controller 2 and a drive circuit 22. Other components may also be provided, as may be discussed below.

The rectifier circuit 202 may include a plurality of diodes D1, D2, D3 and D4. As shown in FIG. 4, the rectifier circuit 202 may be a bridge diode circuit and it may be another type circuit according to embodiments. The rectifier circuit 202 may be configured to rectify the AC input voltage supplied from a power source 20, thereby outputting a voltage having a pulsating waveform.

The smoothing circuit L1 and C1 may smooth the voltage rectified by the rectifier circuit 202 and output a DC link voltage. The smoothing circuit L1 and C1 may include a first inductor L1 and a DC link capacitor C1.

A voltage sensor 212 may sense a magnitude of the voltage output (or voltage value) from the DC link capacitor C1 and transmit the sensed voltage value to the controller 2. A current sensor 214 may sense a magnitude of the current output (or current value) from the inverter circuit 204 and transmit the sensed current value to the controller 2.

When the voltage value measured by the voltage sensor 212 exceeds a first reference value or the current value measured by the current sensor 214 exceeds a second reference value, the controller 2 may perform a protection function for stopping the driving of the working coil by stopping the supply of a control signal to the drive circuit 22.

The inverter circuit 204 may include a first switching element SW1, a second switching element SW2, a third switching element SW3 and a fourth switching element SW4. As shown in FIG. 4, the inverter circuit 204 of the induction heating apparatus 10 according to one embodiment may be configured as a full-bridge circuit including four switching elements SW1, SW2, SW3 and SW4. However, in another embodiment, the inverter circuit 204 may be configured as a half-bridge circuit including two switching elements (e.g., a first switching element SW1 and a second switching element SW2 as shown in FIG. 4).

The first switching element SW1, the second switching element SW2, the third switching element SW3 and the fourth switching element SW4 may be turned on and off by a first switching signal S1, a second switching signal S2, a third switching signal S3 and a fourth switching signal S4, respectively. Each of the switching elements SW1, SW2, SW3 and SW4 may be turned on when each of the switching signals S1, S2, S3 and S4 is at a high level, and each of the switching elements SW1, SW2, SW3 and SW4 may be turned off when each of the switching signals S1, S2, S3 and S4 is at a low level.

In the embodiment of FIG. 4, each of the switching elements SW1, SW2, SW3, and SW4 is an IGBT element, but each of the switching elements SW1, SW2, SW3 and SW4 may be a different type of a switching elements (e.g., BJT or FET, etc.) according to embodiments.

Any of the switching elements SW1, SW2, SW3 and SW4 may be turned on and off to complement each other. For example, in any one of the operation modes, the second switching element SW2 may be turned off (turned on) while the first switching element SW1 is turned on (turned off). In the present disclosure, the switching elements that are turned on and off complementary to each other may be referred to as switching elements 'complementary to each other'.

In addition, any of the switching elements SW1, SW2, SW3 and SW4 may be turned on and off in the same manner as each other. For example, in any of the operation modes, the first switching element SW1 may be turned on and off at the same timing as that of the third switching element SW3. In the present disclosure, the switching elements that are turned on and off at the same timing may be referred to as the switching elements 'belonging to the same group'.

The first switching element SW1 and the third switching element SW3 may be referred to as the switching elements belonging to a first group (i.e., a high side), and the second switching element SW2 and the fourth switching element SW4 may be referred to as the switching elements belonging to a second group (i.e., a low side).

If the inverter circuit 204 according to another embodiment is configured as a half-bridge circuit (i.e., a circuit including only the first switching element SW1 and the second switching element SW2), the first switching element SW1 may belong to the first group and the second switching element SW2 may belong to the second group.

The DC link voltage input to the inverter circuit 204 may be converted into the AC link voltage by the turned-on and turned-off (i.e., the switching operation) of the switching elements SW1, SW2, SW3 and SW4 provided in the inverter circuit 204. The AC current converted by the inverter circuit 204 may be supplied to the working coil 132. As a resonance phenomenon occurs in the working coil 132, an eddy current may flow through the container (or vessel), thereby heating the container (or vessel).

The first switching signal S1, the second switching signal S2, the third switching signal S3 and the fourth switching signal S4 may be pulse width modulation (PWM) signals each having a predetermined duty cycle.

When the AC current output from the inverter circuit 204 is supplied to the working coil 132, the working coil 132 may be driven. While eddy current flows through the container provided on the working coil, with the driving of the working coil 132, the container may be heated. The amount of thermal energy supplied to the container may vary based on the amount of power actually generated by the driving of the working coil (i.e., the actual output power value of the working coil).

When the user changes a current state of the induction heating apparatus 10 into a power on state by manipulating the interface unit, the input power source may supply power to the induction heating apparatus 10 and the induction heating apparatus may enter a driving standby state. The user may put a container on the working coil and set a power level for the container to input a heating start command for the working coil. Once the user inputs the heating start command, a power value required for the working coil (i.e., a required power value) may be determined based on the power level set by the user.

The controller 2 having received the heating start command from the user may determine a frequency corresponding to the required power value of the working coil 132 (i.e., a heating frequency), and supply a control signal corresponding to the determined heating frequency to the drive circuit 22. Accordingly, switching signals S1, S2, S3 and S4 may be output from the drive circuit 22. As the switching signals S1, S2, S3 and S4 are input to the switching elements SW1, SW2, SW3 and SW4, respectively, the working coil 132 may be driven. Once the working coil 132 is driven, an eddy current may flow through the container, and the container may be heated.

In an embodiment of the present disclosure, the controller 2 may determine a heating frequency corresponding to the power level set for the heating region. For example, when the user sets a power level (or power value) for the heating region, the controller 2 may gradually lower the driving frequency of the inverter circuit 204 until the output power value of the working coil 132 in a state where the driving frequency of the inverter circuit 204 is set to a predetermined reference frequency matches the required power value corresponding to the power level set by the user. The controller 2 may determine a frequency detected when the output power value of the working coil 132 matches the required power value as the heating frequency.

The controller 2 may supply a control signal corresponding to the determined heating frequency to the drive circuit 22. The drive circuit 22 may output switching signals S1, S2, S3 and S4 having a duty ratio corresponding to the heating frequency determined by the controller 2 based on the control signal output from the controller 2. While the switching elements SW1, SW2, SW3 and SW4 are turned on and off complementary to each other in response to the input of the switching signals S1, S2, S3 and S4, the alternating current may be supplied to the working coil 132.

In order for the controller 2 to determine the heating frequency as discussed above, the actual output power value of the working coil 132 has to be calculated during the driving of the working coil 132. In one embodiment, the controller 2 may calculate the output power value of the working coil 132 based on the magnitude of the output voltage of the DC link capacitor C1 measured by the voltage sensor 212 (i.e., the DC link voltage value), and the magnitude of the output current of the inverter circuit 204 measured by the current sensor 214 (i.e., the inverter based on the output current value of the inverter circuit 204).

To accurately calculate the output power value of the working coil during the driving of the working coil 132, the magnitude of the voltage input to the working coil 132 and the magnitude of the current input to the working coil 132 may be required.

The magnitude of the current input to the working coil 132 may be substantially equal to the magnitude of the current output from the inverter circuit 204 (i.e., the output current value of the inverter circuit 204).

Similarly, in one embodiment, the magnitude of the voltage input to the working coil 132 may be substantially equal to the magnitude of the voltage output from the inverter circuit 204 (i.e., the output voltage value of the inverter circuit 204). In the embodiment, the output voltage value of the inverter circuit 204 may be calculated based on a DC link voltage function or a switching function of the inverter circuit 204.

Figure 5:
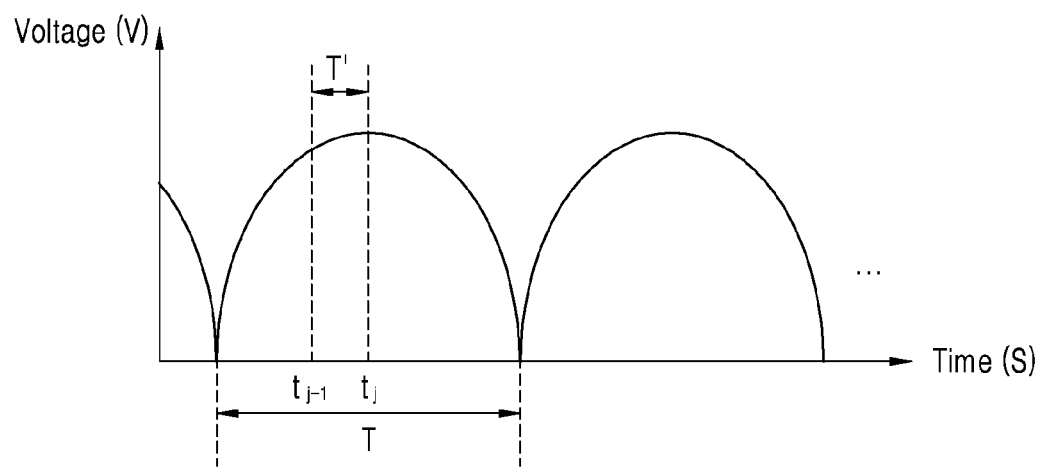
FIG. 5 is a graph illustrating a DC link voltage function of an inverter circuit according to one embodiment.
Figure 6:
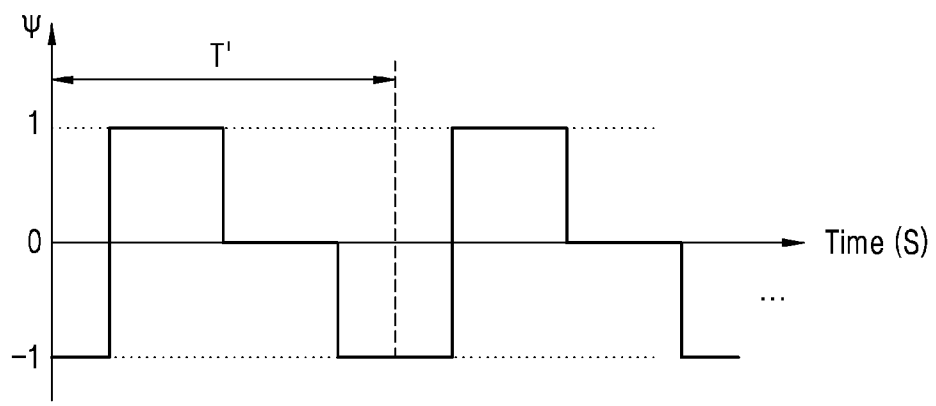
FIG. 6 is a graph illustrating a switching function of the inverter circuit according to one embodiment.
Figure 7:
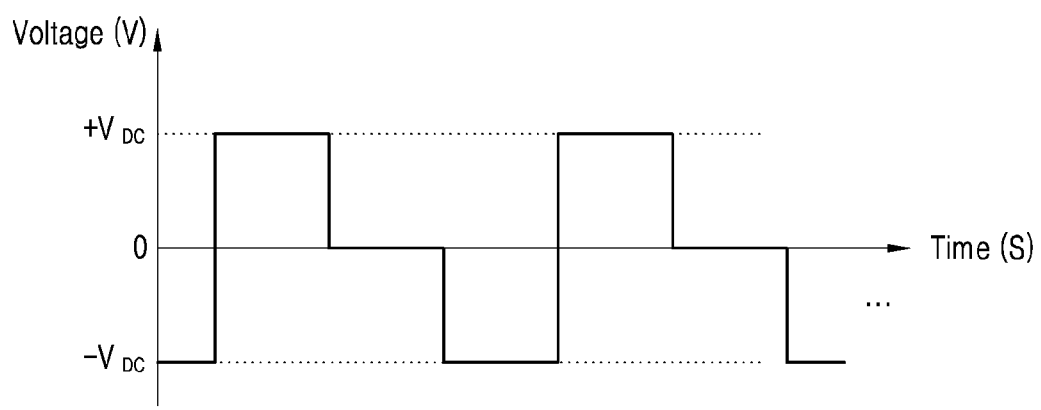
FIG. 7 is a graph illustrating the result of combining the DC link voltage function shown in FIG. 5 and the switching function of the inverter circuit shown in FIG. 6.

FIG. 5 is a graph illustrating a DC link voltage function of an inverter circuit according to one embodiment. FIG. 6 is a graph illustrating a switching function of the inverter circuit according to one embodiment. FIG. 7 is a graph illustrating the result of combining the DC link voltage function shown in FIG. 5 and the switching function of the inverter circuit shown in FIG. 6.

In one embodiment, while the working coil 132 is being driven, the controller 2 may measure the DC link voltage value through the voltage sensor 212. The controller 2 may calculate the DC link voltage function based on the measured DC link voltage value as shown in FIG. 5.

In one embodiment, the controller 2 may calculate the output voltage value of the inverter circuit 204 by using a predetermined switching function of the inverter circuit 204. The switching function of the inverter circuit 204 may be a function representing a voltage level supplied from the inverter circuit 204 to the working coil 132 based on the combination of the switching signals supplied to the inverter circuit 204. As shown in FIG. 6, the switching function may be predetermined during the manufacturing process of the induction heating apparatus 10 and stored in a storage. Accordingly, the controller 2 may refer to a pre-stored switching function.

The switching function shown in FIG. 6 may be a function having a period (T'). The period T' of the switching function shown in FIG. 5 may be smaller than the period T of the DC link voltage function. The period T' of the switching function may repeatedly appear within one period T of the DC link voltage function.

FIG. 7 is a graph illustrating the result of combining the DC link voltage function shown in FIG. 5 and the switching function of the inverter circuit 204 shown in FIG. 6. In FIG. 7, $V_{DC}$ represents the magnitude of the DC link voltage. Specifically, when the DC link voltage function and the switching function of the inverter circuit 204 are combined, the magnitude $V_{DC}$ of the DC link voltage may be directly reflected in the waveform of the switching function of the inverter circuit 204.

The result of combining the DC link voltage function and the switching function of the inverter circuit 204 may be considered to be substantially the same as the output voltage of the inverter circuit 204. Accordingly, the controller 2 may calculate the output power value of the working coil 132 based on the output current function based on the result of combining the DC link function and the switching function of the inverter circuit 204 and the output current value of the inverter circuit 204 measured by the current sensor 214.

In one embodiment, the output power value of P of the working coil 132 may be defined as [Equation 1]:

$$P = \frac{1}{T}\int_0^T v_o(t)i_o(t)dt \qquad \text{[Equation 1]}$$

In [Equation 1], T is the period of the DC link voltage function. In addition, $V_o$ (t) is a function of the output voltage of the inverter circuit 204 and $i_o$ (t) is a function of the output current of the inverter circuit 204.

As discussed above, the output voltage function of the inverter circuit 204 according to one embodiment may be regarded as the combination of the DC link voltage function and the switching function of the inverter circuit 204. Accordingly, [Equation 1] may be transformed as [Equation 2]:

$$P = \frac{1}{T} \int_0^T v_{DC}(t)\Psi(t)i_o(t)dt \qquad \text{[Equation 2]}$$

In [Equation 2], $V_{DC}(t)$ represents a DC link voltage function, and $\psi(t)$ represents a switching function of the inverter circuit 204.

As shown in FIG. 5, the period T' of the switching function is smaller than the period T of the DC link voltage function, and the period T' of the switching function appears repeatedly within one period T of the DC link voltage function. Accordingly, [Equation 2] can be finally transformed as [Equation 3]:

$$P = \frac{1}{N} \sum_{j=1}^{N} \left[ \frac{v_{DC}(t_j)}{T'} \int_{t_{j-1}}^{t_j} \Psi(\tau)i_o(\tau)d\tau \right]. \qquad \text{[Equation 3]}$$

In [Equation 3], $V_{DC}(t_j)$ is a DC link voltage function, $\psi(T)$ is a switching function of the inverter circuit 204, and Io (T) is an output current function of the inverter circuit 204. T' is the period of the switching function, and N is the value obtained by driving the period T of the DC link voltage function by the period T' of the switching function.

According to [Equation 3], the output power value of the working coil 132 may be defined as an integral value of the output voltage function of the inverter circuit calculated based on the DC link voltage value and the output current function of the inverter circuit.

Accordingly, the controller 2 may calculate the output voltage value of the working coil 2 in real time and in software based on [Equation 3]. The output voltage value of the working coil 132 during the driving of the working coil 132 may be calculated quickly and accurately. Since the output voltage value of the working coil 132 is calculated quickly and accurately, the heating operation of the working coil 132 may be controlled more precisely. The control response to the change in the output voltage value of the working coil 132 may be accelerated, so that the control speed of the induction heating apparatus may be improved.

Figure 8:
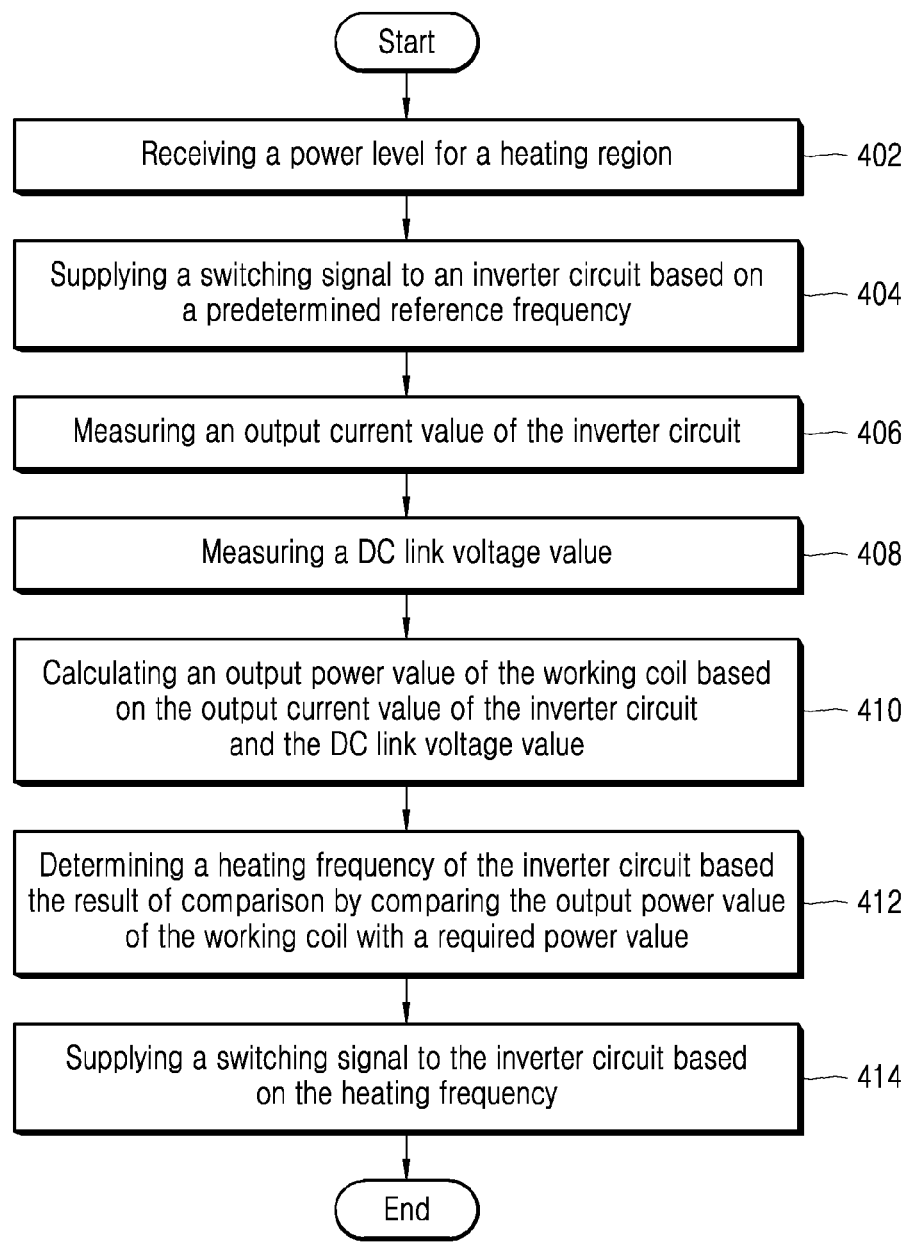
FIG. 8 is a flow chart illustrating a method for controlling the induction heating apparatus according to one embodiment.

FIG. 8 is a flow chart illustrating a method for controlling the induction heating apparatus according to one embodiment of the present disclosure. Referring to FIG. 8, the controller 2 may receive a power level (or power value) for the heating region (or heating area) input through the interface unit 114 (402). Once the power level for the heating region is input, a required power value corresponding to the input power level may be determined.

When the power level is input, the controller 2 may supply a control signal to the drive circuit 22 based on a preset reference frequency (e.g., 60 kHz) and then supply a switching signal to the inverter circuit 204 (404). Accordingly, the working coil 132 may start to output power corresponding to the reference frequency.

While the working coil 132 is being driven, the controller 2 may measure the output current value of the inverter circuit 204 through the current sensor 214 (406). The controller 2 may calculate an output current function of the inverter circuit 204 based on the measured output current value of the inverter circuit 204.

Additionally, while the working coil 132 is being driven, the controller 2 may measure a DC link voltage value through the voltage sensor 212 (408). The controller may calculate a DC link voltage function based on the measured DC link voltage value.

The controller 2 may calculate the output power value of the working coil 132 based on the output current value of the inverter circuit 204 and the DC link voltage value (410).

In one embodiment, the output power value of the working coil 132 may be defined as an integral value of the output voltage function of the inverter circuit calculated based on the DC link voltage value and the output current function of the inverter circuit. Additionally, the output voltage function of the inverter circuit 204 may be calculated by combining the DC link voltage function and the switching function of the inverter circuit.

In one embodiment, the controller 2 may calculate the output power value of the working coil 132 based on [Equation 3].

The controller 2 may compare the calculated output power value with the required power value, and determine the heating frequency of the inverter circuit 204 based on the result of the comparison (412).

The determining of the heating frequency (412) may include adjusting the driving frequency of the inverter circuit 204 until the output power value of the working coil 132 matches the required power value, and determining the driving frequency of the inverter circuit 204 when the output power value of the working coil 132 matches the required power value as the heating frequency.

When the heating frequency is determined, the controller 2 may supply a control signal to the drive circuit 22 based on the heating frequency and supply a switching signal to the inverter circuit 204 (414). Accordingly, the working coil 132 may output power corresponding to the power level, thereby heating the container.

Figure 9:
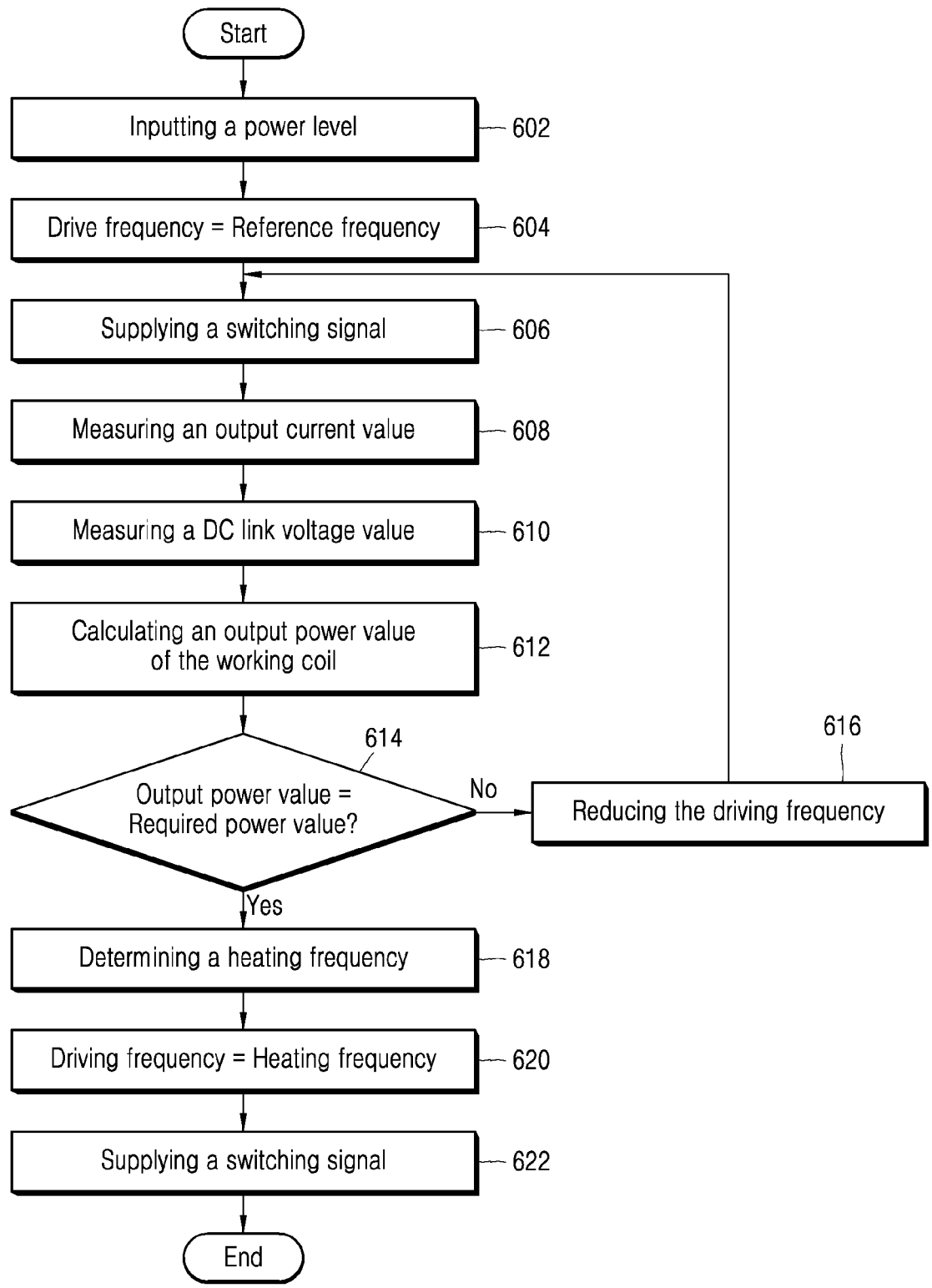
FIG. 9 is a flow chart illustrating a method for controlling the induction heating apparatus according to another embodiment.

FIG. 9 is a flow chart illustrating a method for controlling the induction heating apparatus according to another embodiment of the present disclosure. Referring to FIG. 9, the controller 2 may receive a power level (or power value) for the heating region input through the interface unit 114 (602). Once the power level for the heating region is input, a required power value corresponding to the input power level may be determined.

When the power level is input, the controller 2 may set the driving frequency of the inverter circuit 204 to be a preset reference frequency (e.g., 60 kHz) (604). The size of the reference frequency may vary according to embodiments.

The controller 2 may supply a control signal to the drive circuit 22 based on the preset reference frequency and then supply a switching signal to the inverter circuit 204 (606). Accordingly, the working coil 132 may start to output power corresponding to the reference frequency.

While the working coil 132 is being driven, the controller 2 may measure the output current value of the inverter circuit 204 through the current sensor 214 (608). The controller 2 may calculate an output current function of the inverter circuit 204 based on the measured output current value of the inverter circuit 204.

Additionally, while the working coil 132 is being driven, the controller 2 may measure a DC link voltage value through the voltage sensor 212 (610). The controller may calculate a DC link voltage function based on the measured DC link voltage value.

The controller 2 may calculate the output power value of the working coil 132 based on the output current value of the inverter circuit 204 and the DC link voltage value (612).

In the embodiment, the output power value of the working coil 132 may be defined as an integral value of the output voltage function of the inverter circuit calculated based on the DC link voltage value and the output current function of the inverter circuit. In addition, the output voltage function of the inverter circuit 204 may be calculated by combining the DC link voltage function and the switching function of the inverter circuit.

In one embodiment, the controller 2 may calculate the output power value of the working coil 132 based on [Equation 3].

The controller 2 may compare the calculated output power value with the required power value, and determine the heating frequency of the inverter circuit 204 based on the result of the comparison (614).

Unless the output power value matches (or equals) the required power value in the process or operation (614), the controller 2 may reduce the driving frequency of the inverter circuit 204 by a predetermined unit size (e.g., 1 kHz) (616), and return to the process or operation (606). Accordingly, the driving frequency of the inverter circuit 204 may be reduced until the output power value matches the required power value.

When the output power value matches the required power value in the process or operation (614), the controller may determine the current driving frequency of the inverter circuit 204 as the heating frequency (618) and set the driving frequency of the inverter circuit 204 as the heating frequency (620).

Once determining the heating frequency, the controller may supply switching signals to the inverter circuit 204 by supplying the control signals to the drive circuit 22 based on the heating frequency (622). Accordingly, the working coil 132 may heat the container by outputting power corresponding to the power level.

An object of the present disclosure is to provide an induction heating apparatus that may calculate the output power value of a working coil and the driving of the working coil only with existing elements or circuits, without additional elements or circuits (e.g., a shunt resistor, an input voltage detection circuit and an input current detection circuit), and a method for controlling the induction heating apparatus.

An object of the present disclosure is to provide an induction heating apparatus that may calculate a more accurate output power value based on the actual voltage value and an actual current value to the working coil and control accurate driving of the working coil, and a method for controlling the induction heating apparatus.

An object of the present disclosure is to provide an induction apparatus that may improve control speed and responsiveness to changes in the output power value by calculating the output power value of the working coil by using software.

Aspects according to the present disclosure are not limited to the above ones, and other aspects and advantages that are not mentioned above can be clearly understood from the following description and can be more clearly understood from the embodiments set forth herein.

In embodiments of the present disclosure, an output power value of a working coil may be calculated based on an output voltage of an inverter circuit and an output current. The output voltage of the inverter circuit may be calculated based on a DC link voltage function of the inverter circuit and a switching function of the inverter circuit.

In embodiments, the output power value of the working coil may be an integral value of the output voltage function of the inverter circuit calculated based on the DC link voltage value and the output current function of the inverter circuit.

Embodiments of the present disclosure may provide a method for controlling an induction heating apparatus including steps of: receiving a power level for a heating region; supplying a switching signal to an inverter circuit based on a predetermined reference frequency; measuring an output current value of the inverter circuit; measuring a DC link voltage value; calculating an output power value of the working coil based on the output current value of the inverter circuit and the DC link voltage value; determining a heating frequency of the inverter circuit based the result of comparison by comparing the output power value of the working coil with a required power value; and supplying a switching signal to the inverter circuit based on the heating frequency.

The output power value of the working coil may be an integral value of the output voltage function of the inverter circuit calculated based on the DC link voltage value and the output current function of the inverter circuit.

The output voltage function of the inverter circuit may be calculated by combining the DC link voltage function and the switching function of the inverter circuit.

The DC link voltage may be obtained by rectifying an AC voltage supplied by an external power source and smoothing the rectified voltage.

The output power value of the working coil may be calculated based on the following [Equation 4]:

$$P = \frac{1}{N}\sum_{j=1}^{N}\left[\frac{v_{DC}(t_j)}{T'}\int_{t_{j-1}}^{t_j}\Psi(\tau)i_o(\tau)d\tau\right] \quad \text{[Equation 4]}$$

In the [Equation 4], VDC (tj) is a DC link voltage function, and ψ(T) is a switching function of the inverter circuit, and io (T) is an output current function of the inverter circuit, and T' is a period of the switching function, and N is the value obtained by driving the period of the DC link voltage function by the period T' of the switching function, and P is the output power value of the working coil.

The step of determining the heating frequency of the inverter circuit based the result of comparison by comparing the output power value of the working coil with a required power value may include steps of adjusting a driving frequency of the inverter circuit until the output power value of the working coil matches the required power value; and determining the driving frequency of the inverter circuit, when the output power value of the working coil matches the required power value, as the heating frequency.

Embodiments of the present disclosure may also provide an induction heating apparatus including a working coil provided in a position corresponding to a heating region; an inverter circuit comprising a plurality of switching elements and configured to supply current to the working coil; a drive circuit configured to supply switching signals to the switching elements provided in the inverter circuit, respectively, and a controller configured to determine a driving frequency of the inverter circuit and drive the working coil by supplying a control signal to the drive circuit based on the driving frequency. The controller may be configured to perform a method according to any one of the herein described embodiments.

The controller may receive a power level for a heating region, supplies a switching signal to an inverter circuit based on a predetermined reference frequency, measures an output current value of the inverter circuit, measure a DC link voltage value, calculate an output power value of the working coil based on the output current value of the inverter circuit and the DC link voltage value, determine a heating frequency of the inverter circuit based the result of comparison by comparing the output power value of the working coil with a required power value, and supplies a switching signal to the inverter circuit based on the heating frequency.

The output power value of the working coil may be an integral value of the output voltage function of the inverter circuit calculated, e.g. by the controller, based on the DC link voltage value and the output current function of the inverter circuit. The output voltage function and/or the output current function of the inverter circuit may be stored and/or predetermined for the inverter circuit.

The DC link voltage may be obtained by rectifying an AC voltage supplied by an external power source and smoothing the rectified voltage.

The output voltage function of the inverter circuit may be calculated by combining the DC link voltage function and the switching function of the inverter circuit.

The output power value of the working coil may be calculated based on the following [Equation 5]:

$$P = \frac{1}{N}\sum_{j=1}^{N}\left[\frac{v_{DC}(t_j)}{T'}\int_{t_{j-1}}^{t_j}\Psi(\tau)i_o(\tau)d\tau\right]$$ [Equation 5]

In the [Equation 5], VDC (tj) is a DC link voltage function, and ψ(T) is a switching function of the inverter circuit, and io (T) is an output current function of the inverter circuit, and T' is a period of the switching function, and N is the value obtained by driving the period of the DC link voltage function by the period T' of the switching function, and P is the output power value of the working coil.

The controller may adjust a driving frequency of the inverter circuit until the output power value of the working coil matches the required power value, and determine the driving frequency of the inverter circuit, when the output power value of the working coil matches the required power value, as the heating frequency.

According to an embodiment of the present disclosure, there is an advantage in that the output power value calculation and driving control of the working coil are possible only with the existing elements or circuits without additional elements or circuits (e.g., shunt resistors, input voltage sensing circuits, input current sensing circuits).

According to an embodiment of the present disclosure, there is an advantage in that a more accurate output power value is calculated based on the actual voltage value and the actual current value input to the working coil, and thus accurate driving control of the working coil is possible.

According to an embodiment of the present disclosure, there is an advantage in that the control speed of the induction heating device and the responsiveness to changes in the output power value are improved by calculating the output power value of the working coil by using software.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an induction heating apparatus, comprising:
   receiving a power level for a heating region;
   providing a switching signal to an inverter circuit based on a predetermined reference frequency;
   determining an output current value of the inverter circuit;
   determining a DC link voltage value;
   determining an output power value of a working coil based on the output current value of the inverter circuit and the DC link voltage value;
   determining a heating frequency of the inverter circuit based on the output power value of the working coil and a required power value; and
   providing a switching signal to the inverter circuit based on the determined heating frequency,
   wherein the output power value of the working coil is determined based on the following [Equation]:

$$P = \frac{1}{N}\sum_{j=1}^{N}\left[\frac{v_{DC}(t_j)}{T'}\int_{t_{j-1}}^{t_j}\Psi(\tau)i_o(\tau)d\tau\right] \quad \text{[Equation]}$$

wherein:
   $V_{DC}(t_j)$ is a DC link voltage function,
   $\Psi(\tau)$ is a switching function of the inverter circuit,
   $i_o(\tau)$ is an output current function of the inverter circuit,
   T' is a period of the switching function,
   N is a value obtained by driving a period of the DC link voltage function by the period T' of the switching function, and
   P is the output power value of the working coil.

2. The method for controlling the induction heating apparatus of claim 1, wherein the output power value of the working coil corresponds to an integral value of an output voltage function of the inverter circuit determined based on the DC link voltage value and the output current function of the inverter circuit.

3. The method for controlling the induction heating apparatus of claim 2, wherein the output voltage function of the inverter circuit is determined by combining the DC link voltage function and the switching function of the inverter circuit.

4. The method for controlling the induction heating apparatus of claim 1, wherein the determining of the heating frequency of the inverter circuit is based on a comparison of the output power value of the working coil and the required power value.

5. The method for controlling the induction heating apparatus of claim 4, wherein the determining of the heating frequency of the inverter circuit based on the comparison of the output power value of the working coil and the required power value comprises:
   adjusting a driving frequency of the inverter circuit until the output power value of the working coil equals the required power value; and
   determining the driving frequency of the inverter circuit as the heating frequency, when the output power value of the working coil equals the required power value.

6. An induction heating coil, comprising:
   a working coil provided to correspond to a heating region;
   an inverter circuit comprising a plurality of switching elements, and configured to supply current to the working coil;
   a drive circuit configured to supply switching signals to the switching elements of the inverter circuit, respectively; and
   a controller configured to:
   receive a power level for a heating region,
   provide a switching signal to the inverter circuit based on a predetermined reference frequency,
   determine an output current value of the inverter circuit,
   determine a DC link voltage value,
   determine an output power value of the working coil based on the output current value of the inverter circuit and the DC link voltage value,
   determine a heating frequency of the inverter circuit based on the output power value of the working coil and a required power value, and
   provide a switching signal to the inverter circuit based on the determined heating frequency,
   wherein the output power value of the working coil is determined based on the following [Equation]:

$$P = \frac{1}{N}\sum_{j=1}^{N}\left[\frac{v_{DC}(t_j)}{T'}\int_{t_{j-1}}^{t_j}\Psi(\tau)i_o(\tau)d\tau\right] \quad \text{[Equation]}$$

wherein:
   $V_{DC}(t_j)$ is a DC link voltage function,
   $\Psi(\tau)$ is a switching function of the inverter circuit,
   $i_o(\tau)$ is an output current function of the inverter circuit,
   T' is a period of the switching function,
   N is a value obtained by driving a period of the DC link voltage function by the period T' of the switching function, and
   P is the output power value of the working coil.

7. The induction heating apparatus of claim 6, wherein the output power value of the working coil corresponds to an integral value of an output voltage function of the inverter circuit determined based on the DC link voltage value and the output current function of the inverter circuit.

8. The induction heating apparatus of claim 7, wherein the output voltage function of the inverter circuit is determined by combining the DC link voltage function and the switching function of the inverter circuit.

9. The induction heating apparatus of claim 6, wherein the determining of the heating frequency is based on a comparison of the output power value of the inverter circuit and the required power value.

10. The induction heating apparatus of claim 6, wherein the controller is configured to adjust a driving frequency of the inverter circuit until the output power value of the working coil equals the required power value, and to determine the driving frequency of the inverter circuit as the heating frequency, when the output power value of the working coil equals the required power value.

11. A method for controlling an induction heating apparatus, comprising:
- determining an output current value of an inverter circuit while a working coil is being driven by the inverter circuit;
- determining a DC link voltage value while the working coil is being driven by the inverter circuit;
- determining an output power value of the working coil based on the output current value of the inverter circuit and the DC link voltage value;
- determining a heating frequency of the inverter circuit based on the output power value of the working coil and a required power value,
- wherein the output power value of the working coil is determined based on the following [Equation]:

$$P = \frac{1}{N}\sum_{j=1}^{N}\left[\frac{v_{DC}(t_j)}{T'}\int_{t_{j-1}}^{t_j}\Psi(\tau)i_o(\tau)d\tau\right]$$ [Equation]

wherein:
- $V_{DC}(t_j)$ is a DC link voltage function,
- $\Psi(\tau)$ is a switching function of the inverter circuit,
- $i_o(\tau)$ is an output current function of the inverter circuit,
- T' is a period of the switching function,
- N is a value obtained by driving a period of the DC link voltage function by the period T' of the switching function, and
- P is the output power value of the working coil.

12. The method for controlling the induction heating apparatus of claim 11, comprising:
providing a switching signal to the inverter circuit based on the determined heating frequency.

13. The method for controlling the induction heating apparatus of claim 11, wherein the output power value of the working coil corresponds to an integral value of an output voltage function of the inverter circuit determined based on the DC link voltage value and the output current function of the inverter circuit.

14. The method for controlling the induction heating apparatus of claim 13, wherein the output voltage function of the inverter circuit is determined by combining the DC link voltage function and the switching function of the inverter circuit.

15. The method for controlling the induction heating apparatus of claim 11, wherein the determining of the heating frequency of the inverter circuit is based on a comparison of the output power value of the working coil and the required power value.

16. The method for controlling the induction heating apparatus of claim 11, wherein the determining of the heating frequency of the inverter circuit based on the comparison of the output power value of the working coil and the required power value comprises:
- adjusting a driving frequency of the inverter circuit until the output power value of the working coil equals the required power value; and
- determining the driving frequency of the inverter circuit as the heating frequency, when the output power value of the working coil equals the required power value.

17. The method for controlling the induction heating apparatus of claim 11, comprising:
- receiving a power level for a heating region;
- determining the required power value based on the received power level; and
- providing a switching signal to the inverter circuit based on a predetermined reference frequency.

* * * * *